Dec. 3, 1963   D. S. ROWLEY   3,112,803
DIAMOND DRILL BIT
Filed Jan. 2, 1962

DAVID S. ROWLEY INVENTOR.

BY James E. Reed
ATTORNEY 3,112,803
DIAMOND DRILL BIT
David S. Rowley, Tulsa, Okla., assignor to Jersey Production Research Company, a corporation of Delaware
Filed Jan. 2, 1962, Ser. No. 163,410
6 Claims. (Cl. 175—329)

The present invention relates to rotary bits useful for drilling boreholes in the earth and more particularly relates to an improved diamond bit for drilling oil wells, gas wells, and similar boreholes. In still greater particularity, the invention relates to a diamond drill bit having features which permit more effective entrainment of cuttings and better removal of solids deposited by the drilling fluid than have generally been possible with diamond bits available in the past.

The necessity for effective entrainment of cuttings and removal of solids deposited by the drilling fluid as it infiltrates into the formation at the bottom of the borehole poses a serious problem during diamond bit drilling operations. The conventional bit used in such operations contains a central port through which drilling mud is discharged downwardly beneath the bit and a series of radial or spiral watercourses designed to conduct the mud outwardly from the port to the borehole annulus. The watercourse cross-section is usually semi-circular, the rock formation forming the flat side at the base and the powdered metal matrix of the bit forming the upper semi-circular portion. Drilling mud discharged into these watercourses flows parallel to the formation toward the periphery of the bit. A low velocity film or boundary layer of mud of finite thickness normally exists adjacent the formation, even though the velocities at which mud is discharged into the watercourses are generally sufficient to produce turbulent flow. Scouring of the formation by the mud stream and entrainment of fine cuttings and solids deposited as fluid from the mud infiltrates into the formation takes place to only a limited extent.

The necessity for efficient scouring of the formation is particularly pronounced in diamond drilling operations. Diamond drill bits are ordinarily used in deep boreholes where extremely hard formations preclude the effective use of less expensive bits. The pressure exerted by the drilling fluid against the hole bottom during such operations may reach 7500 p.s.i. or more. Under such pressures, the drilling mud is rapidly forced into permeable formations ahead of the bit, filtering out the entrained solids. A cake of filtered solids quickly builds up and must be drilled by the diamonds. This absorbs bit weight and rotary power, requires non-useful work, and causes low drilling rates and premature bit wear. Moreover, the ordinary diamond bit is very sensitive to "clogging" or "balling" effects due to the accumulation of fine cuttings and mud solids in the spaces between exposed diamonds and between the diamond bearing surface and the formation. Balling leads to overheating of bit parts, low drilling rates and premature wear. Effective scouring of the formation by the drilling fluid is essential to insure that drilled and deposited solids are entrained in the fluid and do not accumulate and cause balling. Even if sufficient solids to cause balling do not accumulate, poor scouring of the formation may have still other adverse effects. If drilled or deposited solids are forced into the opening of a fresh chip fracture in an impermeable formation due to high hydrostatic pressures, the chip will be tightly held against the uncut formation because of the differential pressure acting across it. This also leads to lower drilling rates and premature wear of the bit parts.

Poor cooling and ineffective lubrication of the diamonds and matrix are further difficulties encountered with conventional diamond bits. Friction between the formation and solids trapped between the diamonds leads to the generation of heat which must be dissipated if excessive temperatures and resultant damage to the diamonds and surrounding matrix are to be avoided. Heat dissipation is generally poor because the solids restrict fluid circulation. Diamonds may be lost when an overheated section of the bit is subjected to sudden cooling and thermal shock. Efforts to avoid these and similar difficulties by varying the size and location of the discharge ports and watercourses on diamond drilling bits have not in the past been completely successful.

It is therefore an object of the present invention to provide an improved diamond drilling bit which will permit more effective scouring of the formation and better cooling and lubrication of the diamonds than have generally been obtained with bits available in the past. Another object is to provide a drilling bit beneath which fluid can be discharged at high velocities to prevent reductions in drilling rate due to the accumulation of solids adjacent the diamond-bearing surfaces. A further object is to provide a diamond drilling bit which will permit fluid circulation at rates sufficient to avoid damage to the matrix and loss of the embedded diamonds due to thermal overstressing. Other objects will become apparent as the invention is described in greater detail hereafter.

In accordance with the invention, it has now been found that difficulties encountered during diamond drilling operations due to poor entrainment of solids and inadequate cooling and lubrication of the diamonds and diamond-bearing surfaces can largely be avoided by providing diamond drilling bits with multiple jet nozzles through which drilling fluids can be discharged against the formation at high velocity. Studies have shown that the discharge of a part of the drilling fluid through high velocity nozzles spaced about the bit crown and directed nearly perpendicular to the formation permits rapid scouring of fine solids and cuttings from the formation and that ejection of the remaining fluid at lower velocity near the bit axis and parallel to the formation assures flushing of the drilled solids into the high impact area and results in satisfactory cooling and lubrication of the diamonds and matrix. Higher drilling rates and longer bit life than are normally secured with diamond drilling bits can thus be obtained.

The improved diamond drilling bit of the invention is characterized by an axial passage opening into a discharge port through which a part of the drilling fluid circulated to the bit can be discharged near the bit axis and by branch passages which permit discharge of the remaining fluid toward the formation at high velocities through jet nozzles located in the outer sections of the bit. An erosion-resistant internal nozzle or similar flow restriction is located within the axial passage below inlets to the branch passages and serves to proportion flow between the passages. Fluid passing the flow restriction undergoes a reduction in kinetic energy before reaching the discharge port at the bottom of the bit and therefore emerges from the port at a velocity less than nozzle velocity. This velocity reduction minimizes erosion of the bit structure used to drill the formation beneath the bit axis and yet provides adequate cleaning near the center of the borehole. The fluid thus discharged also serves to cool and lubricate the bit. Fluid circulated through the branch passages emerges from the bit at high velocity through erosion-resistant jet nozzles and impinges against the formation beneath the nozzles. The high velocity fluid scours cuttings and deposited solids from the formation and prevents the accumulation of solids which might otherwise interfere with proper cooling and lubrication of the diamonds on the outer section of the bit. The improved cleaning and better cooling and lubrication thus obtained increase drilling rates and prolong the life of the bit.

The structure and operation of the improved diamond bit can be better understood by referring to the following detailed description of a preferred embodiment and to the accompanying drawing, in which.

Figure 1:
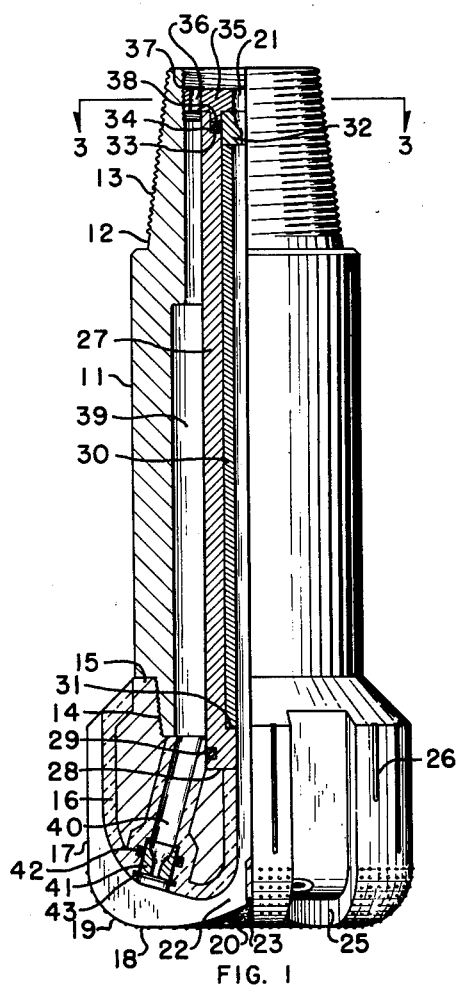
FIGURE 1 is a vertical elevation, partially in section, of a diamond drilling bit provided with a central port for the discharge of drilling fluid at low velocity and with multiple nozzles for discharging fluids at high velocity.

Referring first to FIGURE 1 of the drawing, it can be seen that the bit depicted therein comprises a tubular upper body section 11 of steel or a similar tough, shock-resistant metal. The upper body section is of generally cylindrical shape and includes an upper shank 12 provided with external threads 13 to form a standard A.P.I. tool joint pin. The pin permits connection of the bit at the lower end of a conventional rotary drill string. Alternate means for attaching the tool to a drill string, an A.P.I. tool joint box for example, may be provided if desired. External threads 14 are located near the lower end of the upper body section. A lower body section or crown composed of a steel blank 15 surfaced with a metal matrix 16 in which diamonds or similar cutting elements may be embedded is threaded to and extends below the upper body section. A typical matrix suitable for purposes of the invention may consist of a copper nickel alloy containing powdered tungsten carbide in quantities sufficient to convey the required strength and erosion resistance. Other matrix compositions and methods for fabricating diamond bits are described in the "Diamond Drill Handbook" by J. D. Cumming, 1956 edition, published by J. K. Smit and Sons of Canada, Limited, Toronto.

The lower body section extends laterally beyond the upper body section to form the outer or gage surface 17 of the bit. Below the gage surface, the lower body section is rounded to give a generally convex lower surface or drilling face 18 in which diamonds or similar particulate cutting elements 19 are embedded. Particles of tungsten carbide or similar refractory material having Rockwell A hardnesses in excess of about 85 may be utilized in place of diamonds for certain applications of the bit. The drilling face includes a shallow concave section 20 near the bit axis. The concave section results in a formation of a short rock cone beneath the bit which may assist in centering it in the borehole and provides additional projected area for the placement of diamonds near the center of the bit. In lieu of utilizing a threaded connection between the upper and lower body sections as shown, the blank in the lower section may be welded directly to the upper section to form an integral tool if desired. Projections, recesses or other irregularities may be provided on the outer surface of the blank to improve bonding of the matrix to it.

Figure 2:
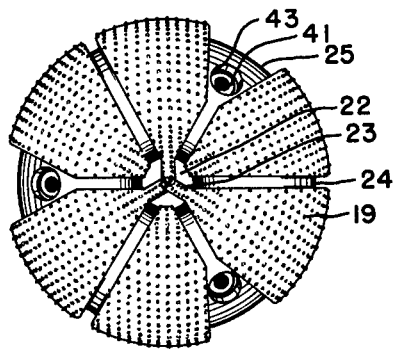
FIGURE 2 is a bottom view of the bit of FIGURE 1.

A central passage 21 extends through the bit body from an opening in shank 12 to a port 22 in drilling face 18. As can be seen more clearly in FIGURE 2 of the drawing, the port is divided into three sections by a "crow's foot" 23 which extends through the longitudinal axis of the bit in order to prevent the formation of a core within the discharge port. Shallow grooves or watercourses 24 in the matrix extend outwardly across the drilling face and up the gage surface of the bit. Junk slots 25 extend outwardly from the discharge port in similar manner. The junk slots are somewhat wider and deeper than the watercourses in order to provide a relatively large area through which solids and fluid may pass upwardly around the lower body section of the bit. Interruption of the bit periphery by junk slots also simplifies tripping of the bit into and out of the borehole. In the particular bit shown, each junk slot increases in width as it progresses from the discharge port to the gage surface in order to accommodate the nozzles utilized for the discharge of drilling fluid at high velocities in accordance with the invention. Three watercourses and three junk slots are shown but it will be understood that a greater or lesser number of each may be employed if desired. The use of spiral watercourses and junk slots tends to permit the flow of fluid beneath the intervening lands on which the diamonds 19 are mounted and is therefore frequently advantageous. A variety of watercourse and junk slot designs suitable for use on the bit of the invention have been developed in recent years and will be familiar to those skilled in the art. Ribs 26 in the gage surface above the diamonds assist in controlling gage wear. The ribs are normally flush with the gage surface and contain embedded diamonds.

Figure 3:
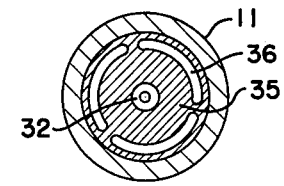
FIGURE 3 is a cross-section of the bit of FIGURE 1 taken about the line 3—3.

The upper body section of the bit shown in the drawing contains a tubular sleeve 27 which extends through the upper body section and seats in the lower body section above an internal shoulder 28 on the lower body section. An O-ring or similar member 29 of rubber, plastic or other resilient material is set in a groove in the outer surface of the sleeve in order to provide a seal between the sleeve and lower body section. A liner 30 of tungsten carbide or similar erosion resistant material fits within the sleeve and seats upon an internal shoulder 31 located near the lower end thereof. A choke nozzle or similar member 32 designed to restrict the flow of fluid into the sleeve and liner is positioned in the upper end of the sleeve and rests upon the liner. The nozzle is formed from tungsten carbide or a similar material highly resistant to erosion. The upper end of the sleeve contains an internal shoulder 33 upon which an O-ring or packing 34 is positioned to provide a seal between the sleeve and nozzle. A spacer 35 containing openings 36 seats against the sleeve and nozzle and is held in place by internal threads 37 in the upper body section. A rim 38 on the lower surface of the spacer extends downwardly against the packing between the sleeve and nozzle. The sleeve and upper body section thus form an annular chamber 39 into which drilling fluid may be introduced through the openings in spacer 35. The arrangement of the openings of the spacer is shown more clearly in FIGURE 3 of the drawing.

The inside diameter of internal nozzle 32 and the position of the nozzle above crow's foot 23 in the discharge port will depend upon a number of factors, including the rate at which drilling fluid is to be circulated through the bit, the number and size of the nozzles to be employed for high velocity discharge of the fluid, the portion of the total fluid to be discharged near the bit axis, and the desired fluid velocity through the discharge port in the lower body section. The choke and jet nozzle diameters will generally be selected so that at least half of the total fluid will pass through the outer nozzles and be discharged against the formation at high velocity. The location of the choke nozzle must be such that a substantial reduction in the velocity of the fluid passing through it will occur before the fluid reaches the crow's foot. The choke nozzle diameter required for a particular drilling fluid throughput and the choke nozzle height needed to avoid severe erosion of the crow's foot in a particular bit can be readily calculated.

Branch passages 40 extends through the lower body section of the bit from opening in annular chamber 39 to outlets in the junk slots on the lower bit surface. Jet nozzles 41 of tungsten carbide or other erosion-resistant material are located in the lower ends of the branch passages. The jet nozzles may be sealed by means of O-rings 42 and held in place by snap rings 43 as shown or may instead be bonded in place. The particular bit shown contains three jet nozzles but a greater or lesser number may be provided if desired. The nozzles may be arranged either symmetrically or asymmetrically and may be spaced at different distances from the center of the bit. They may also be inclined at different angles to the bit axis. It is generally preferred to install the nozzles so that the fluid discharged through each nozzle impinges against the formation at a different distance from the center of the borehole. This normally permits better scouring of the bottom of the hole than can be obtained otherwise.

Figure 4:
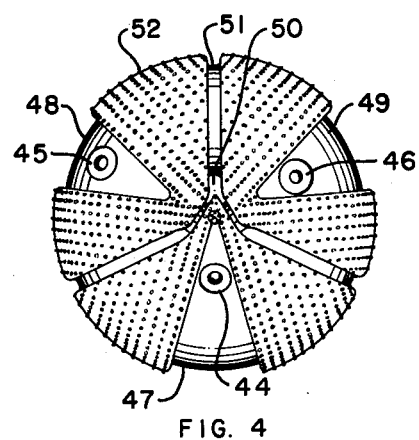
FIGURE 4 is a bottom view of a modified form of the bit shown in FIGURES 1, 2 and 3.

FIGURE 4 of the drawing is a bottom view of a modified form of the bit of the invention. It will be noted that the high velocity outer nozzles 44, 45 and 46 are not equally spaced from the longitudinal axis of the tool. Junk slot 47 extends inwardly from the bit periphery to a point near the center. Junk slots 48 and 49, on the other hand, are somewhat shorter and extend inwardly to points adjacent an off-center discharge port 50. Watercourses 51 extend from the discharge port to the bit periphery between the junk slots, thus separating the drilling surface into lands or pads on which the diamonds 52 employed as cutting elements are mounted. Diamonds at the center of the drilling surface cut away the formation without leaving a core. A number of other bottom configurations suitable for use on the bit will suggest themselves to those skilled in the art.

In utilizing the improved drill bit of the invention, drilling fluid is circulated downwardly through the drill string to which the bit is connected. A part of the fluid supplied to the bit enters internal choke nozzle 32 in the upper body section and flows downwardly through sleeve 27 and liner 30. The choke nozzle results in an increase in the kinetic energy of the fluid and hence the velocity increases. This kinetic energy is dissipated within the liner because of its relatively large diameter. The fluid for the watercourses is therefore discharged through port 22 in the lower surface of the bit at a relatively low velocity. As pointed out earlier, the choke nozzle diameter and the length and diameter of the sleeve and liner may be selected to obtain velocities which will result in little or no erosion of the matrix near the bit axis. The discharged fluid flows outwardly through the watercourses and beneath the adjacent lands or pads, flushing cuttings and solids from under the pads toward the high fluid impact nozzles and junk slots.

Due to the presence of internal choke nozzle 32 in the upper body section of the bit, most of the drilling fluid which is supplied to the bit from the drill string flows through openings 36 in spacer 35, rather than through the choke nozzle. Again the size of the internal choke nozzle and that of the jet nozzles can be selected to permit the desired distribution of the fluid. The fluid passing through openings 36 flows downwardly through annular chamber 39 and into branch passages 40. The discharge nozzles 41 increase the kinetic energy of this fluid to permit its discharge at high velocity against the formation beneath the outer section of the bit. The high velocity fluid scours cuttings from the formation, entraining them outwardly and upwardly through the junk slots to the borehole annulus above the bit. The fluid discharged from the port flows beneath the lands adjacent the junk slots, entraining cuttings and solids and cooling and lubricating the diamonds. The use of multiple jets for discharging fluid at high velocity as described permits much more effective utilization of the drilling fluid than might otherwise be obtained.

It will be understood that the invention is not limited to the specific tool depicted in the drawing. In lieu of utilizing a separate sleeve and liner as shown, the upper body section of the bit may be cast in one piece. The branch passages may extend to the upper part of the body section above the internal nozzle, rather than extending into an annular chamber which in turn extends to an opening adjacent the nozzle in the upper part of the bit. Two, three, four, or more discharge nozzles spaced at various distances from the longitudinal axis of the bit and inclined at various angles to the axis may be provided to permit high velocity discharge of the fluid at radially spaced points beneath the bit. Regularly or irregularly shaped particles or cutting elements of tungsten carbide, particles of a multiple carbide containing tungsten carbide plus titanium carbide or tantalum carbide, or particles of a similar hard metallic, intermetallic or non-metallic material may be employed as cutting elements in lieu of diamonds. These and similar modifications of the structure specifically described above will readily suggest themselves to those skilled in the art.

What is claimed is:

1. A rotary drill bit comprising a hollow body member having an upper shank provided with means for providing said member to the lower end of a rotary drill string and a lower face for engaging the formation at the bottom of the borehole, said body member containing an inlet in said upper shank, a discharge port in said lower face near the longitudinal axis of said member, and a plurality of outlets in said lower face near the periphery thereof; a tubular conduit extending upwardly within said body member about said discharge port, said conduit forming an annular section in said body member communicating with said outlets; an erosion-resistant internal nozzle in said conduit above said discharge port; erosion-resistant discharge nozzles in said outlets; and particulate cutting elements embedded in said lower face of said body member.

2. A rotary drill bit comprising a hollow body member having an upper shank for connecting said member to the lower end of a rotary drill string and a lower face for engaging the formation at the bottom of the borehole, said body member having an inlet in said upper shank, a discharge port in said lower face near the longitudinal axis of said body member and a plurality of outlets in said lower face radially spaced from said discharge port; a tubular sleeve seated in said body member about said discharge port and extending upwardly in said member, said sleeve forming an annular section in said body member communicating with said outlets; an annular spacer extending between said body member and said sleeve near the upper end of said sleeve, said spacer containing an opening through which fluid can pass from said inlet into said annular section; an erosion-resistant internal nozzle in said sleeve near the upper end thereof; erosion-resistant discharge nozzles in said outlets in said lower face; and a plurality of particulate cutting elements embedded in said lower face.

3. A bit as defined by claim 2 wherein said lower face contains junk slots extending outwardly from points near the longitudinal axis of said body member and said outlets in said lower face are located within said junk slots near the outer ends thereof.

4. A diamond drill bit comprising a hollow body member having an upper shank for connecting said member to the lower end of a rotary drill string and a lower face for engaging the formation at the bottom of the borehole, said body member having an inlet in said upper shank, a discharge port in said lower face near the longitudinal axis of said body member, a plurality of channels in said lower face extending outwardly from the vicinity of said discharge port to the periphery of said body member, and a plurality of outlets located in said channels near the outer ends thereof; a tubular sleeve seated in said body member about said discharge port and extending upwardly within said body member, said sleeve forming an annular section in said body member communicating with said outlets; an erosion-resistant nozzle mounted in said sleeve near the upper end thereof; and a plurality of diamonds embedded in said lower face.

5. A rotary drill bit comprising a body member provided with means for connecting said member to the lower end of a rotary drill string and with a lower face for engaging the formation at the bottom of a borehole, said body member containing a first longitudinal passageway extending from an opening near the upper end of said member to a discharge port in said lower face near the longitudinal axis of said member and a second longitudinal passageway extending from an opening near the upper end of said member to an outlet in said lower face laterally displaced from said discharge port; means within said first longitudinal passageway near the upper end thereof for reducing the quantity of fluid passing through said first passageway; means within said second longitudinal passageway near the lower end thereof for increasing the velocity of fluid discharge from said outlet; and a plurality of particulate cutting elements embedded in said lower face of said body member.

6. A rotary drill bit comprising a body member provided with means near the upper end thereof for connecting said member to the lower end of a rotary drill string and with a lower face for engaging the formation at the bottom of a borehole, said body member containing a central passageway extending from an opening near the upper end of said member to a discharge port in said lower face near the longitudinal axis of said member and an outer passageway extending from an opening near the upper end of said member to an outlet in said lower face between said discharge port and the periphery of said body member; an erosion-resistant nozzle in said central passageway near the upper end thereof; an erosion-resistant nozzle in said outer passageway near said outlet; and a plurality of diamonds embedded in said lower face of said body member.

References Cited in the file of this patent
UNITED STATES PATENTS

| | | |
|---|---|---|
| 1,861,007 | Grainger | May 31, 1932 |
| 2,175,471 | Krick et al. | Oct. 10, 1939 |
| 2,238,895 | Gage | Apr. 22, 1941 |
| 2,381,415 | Williams | Aug. 7, 1945 |
| 2,493,178 | Williams | Jan. 3, 1950 |
| 2,719,026 | Boice | Sept. 27, 1955 |
| 2,815,936 | Peter et al. | Dec. 10, 1957 |
| 2,855,182 | Payne | Oct. 7, 1958 |
| 2,901,223 | Scott | Aug. 25, 1959 |

FOREIGN PATENTS

| | | |
|---|---|---|
| 1,217,893 | France | Dec. 14, 1959 |